(12) United States Patent
Fitzgerald et al.

(10) Patent No.: US 12,393,021 B2
(45) Date of Patent: Aug. 19, 2025

(54) OPTICAL COMPONENTS FOR GHOST IMAGE SUPPRESSION SYSTEMS AND METHODS

(71) Applicant: Teledyne FLIR Commercial Systems, Inc., Goleta, CA (US)

(72) Inventors: Gregory Fitzgerald, Marlborough, MA (US); Alan D. Kathman, Charlotte, NC (US); David Ovrutsky, Charlotte, NC (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 369 days.

(21) Appl. No.: 17/709,347

(22) Filed: Mar. 30, 2022

(65) Prior Publication Data
US 2022/0326514 A1    Oct. 13, 2022

Related U.S. Application Data

(60) Provisional application No. 63/169,011, filed on Mar. 31, 2021.

(51) Int. Cl.
| | |
|---|---|
| *G02B 27/00* | (2006.01) |
| *H04N 23/23* | (2023.01) |
| *H04N 23/51* | (2023.01) |
| *H04N 23/52* | (2023.01) |
| *H04N 23/54* | (2023.01) |
| *H04N 23/55* | (2023.01) |

(52) U.S. Cl.
CPC ......... *G02B 27/0018* (2013.01); *H04N 23/23* (2023.01); *H04N 23/51* (2023.01); *H04N 23/52* (2023.01); *H04N 23/54* (2023.01); *H04N 23/55* (2023.01)

(58) Field of Classification Search
CPC ........ G02B 27/0018; G02B 1/10; G02B 1/11; G02B 13/001–009; H04N 23/11; H04N 23/20; H04N 23/21; H04N 23/23; H04N 23/50; H04N 23/51; H04N 23/52; H04N 23/54; H04N 23/55; G03B 17/02; G03B 17/08; G03B 30/00; G03B 2217/00; G03B 2217/002; B60R 11/04; H04M 1/0264
See application file for complete search history.

(56) References Cited

U.S. PATENT DOCUMENTS

| | | | | |
|---|---|---|---|---|
| 5,793,538 A | * | 8/1998 | Cameron | G02B 17/0808 359/356 |
| 2004/0211907 A1 | * | 10/2004 | Wellman | G01J 5/0806 250/353 |

(Continued)

*Primary Examiner* — Twyler L Haskins
*Assistant Examiner* — Akshay Trehan
(74) *Attorney, Agent, or Firm* — Haynes and Boone, LLP

(57) ABSTRACT

Various techniques are disclosed to provide for reducing undesired reflections in captured images. In one example, a system includes an optical element configured to pass radiation from a scene. The system also includes an imager configured to capture images in response to the scene radiation and reflect at least a portion of the scene radiation to the optical element. The optical element comprises a surface with a convex radius of curvature facing the imager and configured to receive and return the reflected radiation toward the imager in a distribution pattern to reduce a magnitude of the reflected radiation in the captured images. Additional methods, devices, and systems are also provided.

20 Claims, 13 Drawing Sheets

(56) References Cited

U.S. PATENT DOCUMENTS

| | | | |
|---|---|---|---|
| 2007/0053685 A1* | 3/2007 | Shibata | H10F 39/804 |
| | | | 396/529 |
| 2014/0340691 A1* | 11/2014 | Smith | G01B 11/24 |
| | | | 356/601 |
| 2016/0037022 A1* | 2/2016 | Matsuzaki | H04N 5/211 |
| | | | 348/335 |
| 2018/0157012 A1* | 6/2018 | Jin | G02B 13/18 |
| 2018/0278817 A1* | 9/2018 | Shimizu | G03B 17/14 |
| 2019/0089914 A1* | 3/2019 | Richarte | G01J 3/2823 |
| 2021/0150742 A1* | 5/2021 | Sato | H04N 5/2226 |
| 2021/0364360 A1* | 11/2021 | Hosaka | G01J 5/0806 |

* cited by examiner

OPTICAL COMPONENTS FOR GHOST IMAGE SUPPRESSION SYSTEMS AND METHODS

CROSS REFERENCE TO RELATED APPLICATIONS

This application claims priority to and the benefit of U.S. Provisional Patent Application No. 63/169,011 filed Mar. 31, 2021 and entitled "OPTICAL COMPONENTS FOR GHOST IMAGE SUPPRESSION SYSTEMS AND METHODS," which is hereby incorporated by reference in its entirety.

TECHNICAL FIELD

The present invention relates generally to image capture and, more particularly, to the reduction of undesired reflections in captured images.

BACKGROUND

In imaging systems, radiation from a scene may be received and captured by an imager. In some cases, at least a portion of the original radiation may be reflected internally within the imaging system. As a result, the imager may capture images that include a feature of the scene represented twice: a first representation from the originally received radiation; and a second representation (e.g., a "ghost image") from the reflected radiation.

For example, when hot bright sources of infrared radiation are imaged by a thermal imaging camera with a protective window positioned close to its pupil, infrared radiation may pass through the protective window, reflect off a vacuum package lid of a thermal imager, reflect back off the protective window, and be captured by the thermal imager as a ghost image.

Although anti-reflective coatings may be employed on the protective window and the vacuum package lid, they may not be effective at attenuating all reflected wavelengths. For example, certain microbolometer-based thermal imagers may be responsive over a wide wavelength range (e.g., 5 microns to 14 microns). However, some anti-reflective coatings may only be effective over a limited subset of such range (e.g., 8 microns to 14 microns). As a result, thermal imagers may be susceptible to capturing ghost images even if anti-reflective coatings are provided on the protective window, package lid, or other portions of a thermal imaging system.

SUMMARY

Various techniques are disclosed to provide for reducing undesirable reflections within imaging systems. In particular, various optical systems may be included with one or more optical elements configured to reduce such reflections. For example, in some embodiments, a curved protective window having a curved inner surface with a convex radius of curvature may be provided to defocus reflected radiation in a wide distribution pattern such that it is less prominent in captured images. In another example, a filter may be provided to attenuate reflected radiation.

In one embodiment, a system includes an optical element configured to pass radiation from a scene; an imager configured to capture images in response to the scene radiation and reflect at least a portion of the scene radiation to the optical element; and wherein the optical element comprises a surface with a convex radius of curvature facing the imager and configured to receive and return the reflected radiation toward the imager in a distribution pattern to reduce a magnitude of the reflected radiation in the captured images.

In another embodiment, a method includes passing radiation from a scene by an optical element; capturing images in response to the scene radiation by an imager; reflecting at least a portion of the scene radiation to the optical element by the imager; receiving the reflected radiation at a surface of the optical element having a convex radius of curvature facing the imager; and returning the reflected radiation toward the imager by the surface of the optical element in a distribution pattern to reduce a magnitude of the reflected radiation in the captured images.

In another embodiment, a method includes passing radiation from a scene by an optical element; capturing images in response to the scene radiation by an imager; reflecting at least a portion of the scene radiation to the optical element by the imager; and reducing, by the optical element, a magnitude of the reflected radiation in the captured images.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques are provided to reduce reflected radiation in images captured by imaging systems. In some embodiments, an optical element such as a curved protective window (e.g., a zero power curved window (ZPCW)) may be provided in an imaging system. The curved protective window may operate to defocus reflected radiation and thus decrease the magnitude of the reflected radiation (e.g., ghost images) in captured images. For example, the curved protective window may be implemented such that it does not otherwise affect the optical performance of the imaging system when positioned in front of a lens. As a result, manufacturers may include such curved protective windows in imaging systems without requiring changes to lenses of such systems.

In some embodiments, a filter may be positioned between an image sensor and a lens behind a protective window (e.g., flat, curved, or otherwise) of an imaging system. The filter may be implemented to attenuate (e.g., filter out) wavelengths that are typically passed by anti-reflective coatings (e.g., outside the wavelength ranges typically attenuated by anti-reflective coatings). As a result, reflected radiation in such wavelength ranges may be reduced in captured images.

Figure 1:
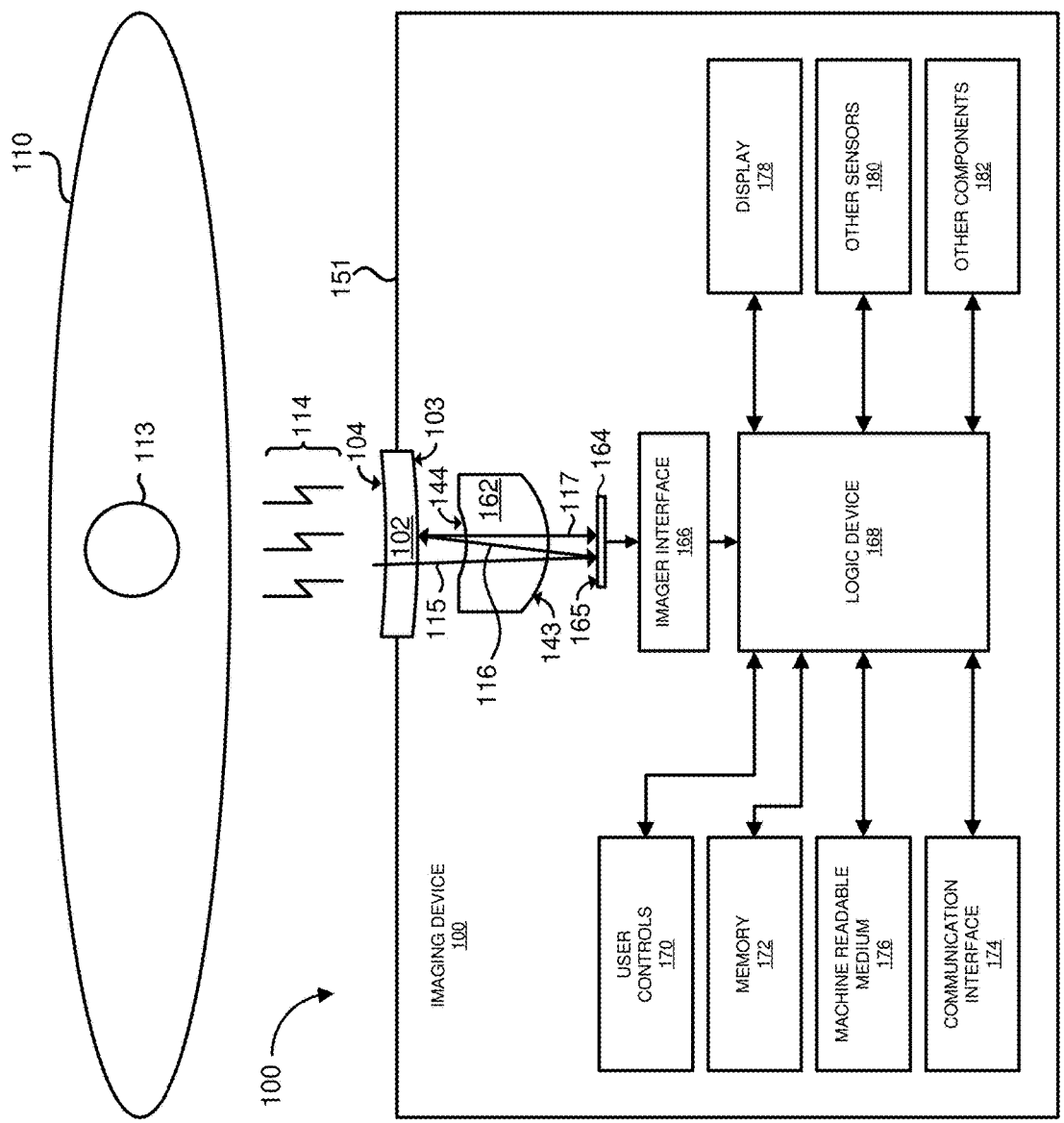
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. As shown, imaging system 100 includes a housing 151 (e.g., a camera body), an optical system 161, an imager 164, an imager interface 166, a logic device 168, user controls 170, a memory 172, a communication interface 174, a machine readable medium 176, a display 178, other sensors 180, and other components 182.

In various embodiments, imaging system 100 (e.g., an imaging device) may be implemented, for example, as a camera system such as a portable (e.g., handheld) camera system, a small form factor camera system implemented as part of another device, a fixed camera system, and/or other appropriate implementations. Imaging system 100 may be positioned to receive electromagnetic radiation 114 of various wavelengths from a scene 110 (e.g., a field of view of imaging system 100). In various embodiments, scene 110 may include one or more features 113 such as objects, persons, and/or other features.

Optical system 161 includes one or more optical elements including a curved protective window 102, a lens 162, and/or a filter (not shown in FIG. 1). Curved protective window 102 seals an interior volume of housing 151 (e.g., wherein imager 164 is disposed) from the outside environment (e.g., scene 110). In various embodiments, curved protective window 102 may be comprised of silicon, germanium, zinc sulfide, and/or zinc selenide. In various embodiments, any desired combination of optical elements may be provided (e.g., various components may be included and/or omitted as appropriate for particular implementations).

In the embodiment illustrated in FIG. 1, curved protective window 102 is implemented as a zero power curved window (ZPCW) with a curved inner surface 103 facing lens 162 and imager 164 and having a convex radius of curvature. Curved protective window 102 further includes a curved outer surface 104 facing scene 110 and having a concave radius of curvature. When configured with a ZPCW implementation, curved protective window 102 provides various reflection reducing benefits as discussed herein, but without adversely affecting the focus of optical system 161.

Lens 162 focuses radiation 114 on imager 164. Lens 162 includes an inner surface 143 facing imager 164 and an outer surface 144 facing curved protective window 102 and scene 110.

Imager 164 captures images in response to radiation 114 and includes a top surface 165 facing lens 162, curved protective window 102, and scene 110. In embodiments where imaging system 100 is a thermal imaging system, imager 164 may be a microbolometer-based thermal imager responsive to radiation 114 (e.g., infrared radiation) over a wavelength range of 5 microns to 14 microns (e.g., capturing thermal images over that wavelength range). For example, imager 164 may be implemented by a vacuum package assembly with a focal plane array (FPA) of microbolometer sensors disposed therein and surface 165 may correspond to a lid of the vacuum package assembly.

In various embodiments, one or more anti-reflective coatings may be provided on one or more of surfaces 103, 104, 143, 144, and/or 165 of optical system 161 and imager 164. In some cases, such anti-reflective coatings may reduce internal reflections of radiation 114 within imaging system 100 over certain limited wavelength ranges that at least partially overlap with an absorption wavelength range of imager 164 (e.g., the absorption wavelength range corresponding to the spectrum of radiation 114 captured by imager). However, in some cases, at least a portion of the absorption wavelength range may not be affected by the anti-reflective coatings (e.g., radiation 114 in certain wavelength ranges may still be reflected by one or more of surfaces 103, 104, 143, 144, and/or 165 even with anti-reflective coatings in place).

For example, in some embodiments, anti-reflective coatings on surfaces 103, 104, 143, 144, and/or 165 may reduce reflections (e.g., permit transmission) over a wavelength range of 8 microns to 14 microns, but may permit some reflections (e.g., exhibit reduced transmission) over a wavelength range of 2 microns to 7 microns. As discussed, when imager 164 is implemented as a thermal imager, it may capture thermal images over a wider wavelength range (e.g., 5 microns to 14 microns). As a result, at least a portion of radiation 114 captured by imager 164 may still be susceptible to reflections (e.g., a wavelength range of 5 microns to 7 or 8 microns) despite the presence of anti-reflective coatings. Various techniques are provided herein to reduce the magnitude of such reflections in images captured by imager 164.

As shown in FIG. 1, radiation 114 (e.g., scene radiation) enters optical system 161 along a path 115 where it passes through curved protective window 102 and lens 162, and is received by imager 164 to be captured in an image. At least a portion of radiation 114 reflects off surface 165 of imager 164 (e.g., reflected radiation) and returns through lens 162 to curved protective window 102 along a path 116. Curved protective window 102 receives the reflected portion of radiation 114 at curved inner surface 103 and returns (e.g., reflects) it back to imager 164 along a path 117. As discussed, curved inner surface 103 may have a convex radius of curvature (e.g., in contrast to a flat surface). This causes curved inner surface 103 to return the portion of radiation 114 along path 117 in a wide distribution pattern that defocuses the reflected portion of radiation 114 and disperses it over a larger area of imager 164 than the original radiation 114 received along path 115. In some embodiments, curved protective window 102 may have a focal length greater than 100 meters to provide the defocusing.

As imager 164 captures thermal images of the original radiation 114 received over path 115 and the dispersed reflected portion of radiation 114 received over path 117 (e.g., captured during the same integration period of imager 164), the magnitude of the reflected portion of radiation 114 will be substantially reduced in the captured thermal images. As a result, ghost images associated with the reflected portion of radiation 114 may be accordingly reduced.

In some embodiments, curved protective window 102 may be implemented using the following equation 1:

$$\varphi = (n-1)\left[\frac{1}{R_1} - \frac{1}{R_2} + \frac{(n-1)d}{nR_1R_2}\right] \quad \text{(equation 1)}$$

In equation 1, φ is the optical power, n is a refractive index of the material of curved protective window 102, R1 is a radius of curvature of convex curved inner surface 103, R2 is a radius of curvature of concave curved outer surface 104, d is a thickness of curved protective window 102. For example, a ZPCW curved protective window 102 implemented with germanium, a thickness d of 2 mm, and a radius of curvature R1 of 50 mm, would have a radius of curvature R2 of 48.5 mm.

Imager 164 may include an array of sensors for capturing images (e.g., image frames) of scene 110. For example, in some embodiments, imager 164 may be a thermal imager including an FPA disposed in a vacuum package assembly and including an array of unit cells and a read out integrated circuit (ROIC). Each unit cell may be provided with an infrared detector (e.g., a microbolometer or other appropriate sensor) and associated circuitry to provide image data for a pixel of a captured thermal image. In some embodiments, imager 164 may also include one or more analog-to-digital converters for converting analog signals captured by the sensors into digital data (e.g., pixel values) to provide the captured images. Further descriptions of ROICs and infrared sensors (e.g., microbolometer circuits) may be found in U.S. Pat. No. 6,028,309 issued Feb. 22, 2000, which is incorporated herein by reference in its entirety.

Imager 164 is primarily described herein as a thermal imager configured to capture thermal wavelengths. However, it will be appreciated that imagers associated with other wavelengths are also contemplated where appropriate (e.g., visible light, ultraviolet, microwave, and/or others).

Imager interface 166 provides the captured images to logic device 168 which may be used to process the images, store the original and/or processed images in memory 172, and/or retrieve stored images from memory 172. In some embodiments, imager interface 166 may provide the captured images directly to memory 172 as shown.

Although a single imager 164 is illustrated, a plurality of imagers 164 and associated components may be provided in other embodiments. For example, different imagers 164 may be provided to capture the same or different wavelengths of radiation 114 simultaneously to provide associated captured images in some embodiments.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging system 100 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of imaging system 100 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging system 100 and/or separate from imaging system 100, with stored instructions provided to imaging system 100 by coupling the machine readable medium 176 to imaging system 100 and/or by imaging system 100 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of imaging system 100. Logic device 168 may be configured to display images and information on display 178. For example, logic device 168 may be configured to retrieve images and information from memory 172 and provide images and information to display 178 for presentation to the user of imaging system 100. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

Imaging system 100 may include various types of other sensors 180 including, for example, microphones, navigation sensors, temperature sensors, and/or other sensors as appropriate.

Logic device 168 may be configured to receive and pass images from imager interface 166 and signals and data from sensors 180, and/or user controls 170 to a host system and/or other external devices (e.g., remote systems) through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Imaging system 100 may include various other components 182 such as speakers, additional displays, visual indicators (e.g., recording indicators), vibration actuators, a battery or other power supply (e.g., rechargeable or otherwise), and/or additional components as appropriate for particular implementations.

Although various features of imaging system 100 are illustrated together in FIG. 1, any of the various illustrated components and subcomponents may be implemented in a distributed manner and used remotely from each other as appropriate (e.g., through appropriate wired and/or wireless network communication).

FIGS. 2 to 6 will now be discussed in relation to an imaging system 200 implemented in the manner of imaging system 100 of FIG. 1 but with an optical system 261 in place of optical system 161. Optical system 261 includes one or more optical elements including a flat protective window 202, lens 162 (e.g., implemented in the manner of FIG. 1), and/or a filter (not shown in FIG. 2). In various embodiments, anti-reflective coatings may be provided on any of the various surfaces of optical elements in optical system 261.

Flat protective window 202 seals an interior volume of housing 151 (not shown in FIG. 2) similar to curved protective window 102 of FIG. 1. Flat protective window 202 is implemented with a flat inner surface 203 facing lens 162 and imager 164. Flat protective window 202 further includes a flat outer surface 204 facing scene 110.

Figure 2:
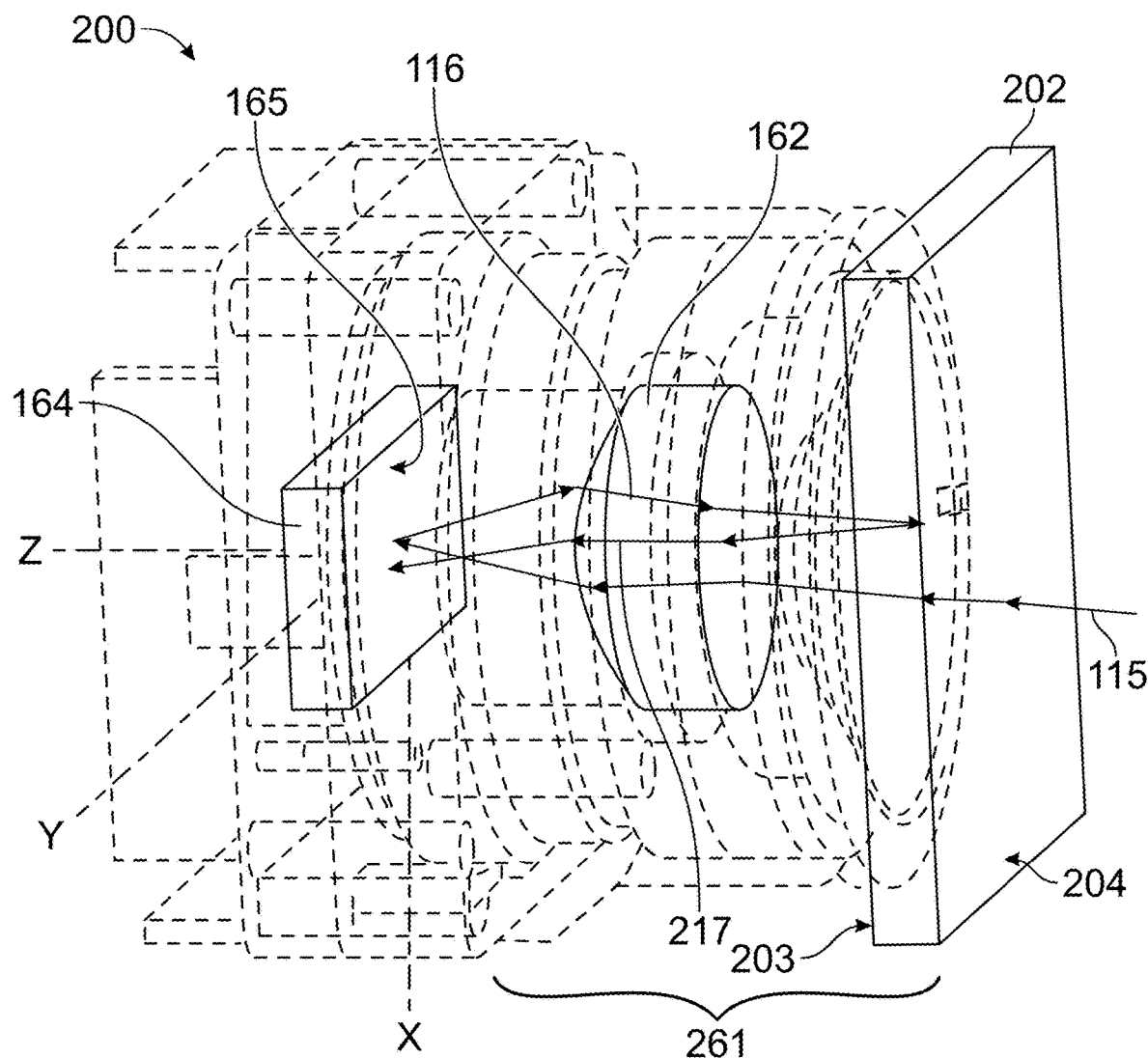
FIGS. 2 and 3 illustrate radiation paths in an imaging system having a flat protective window in accordance with embodiments of the disclosure.
Figure 3:
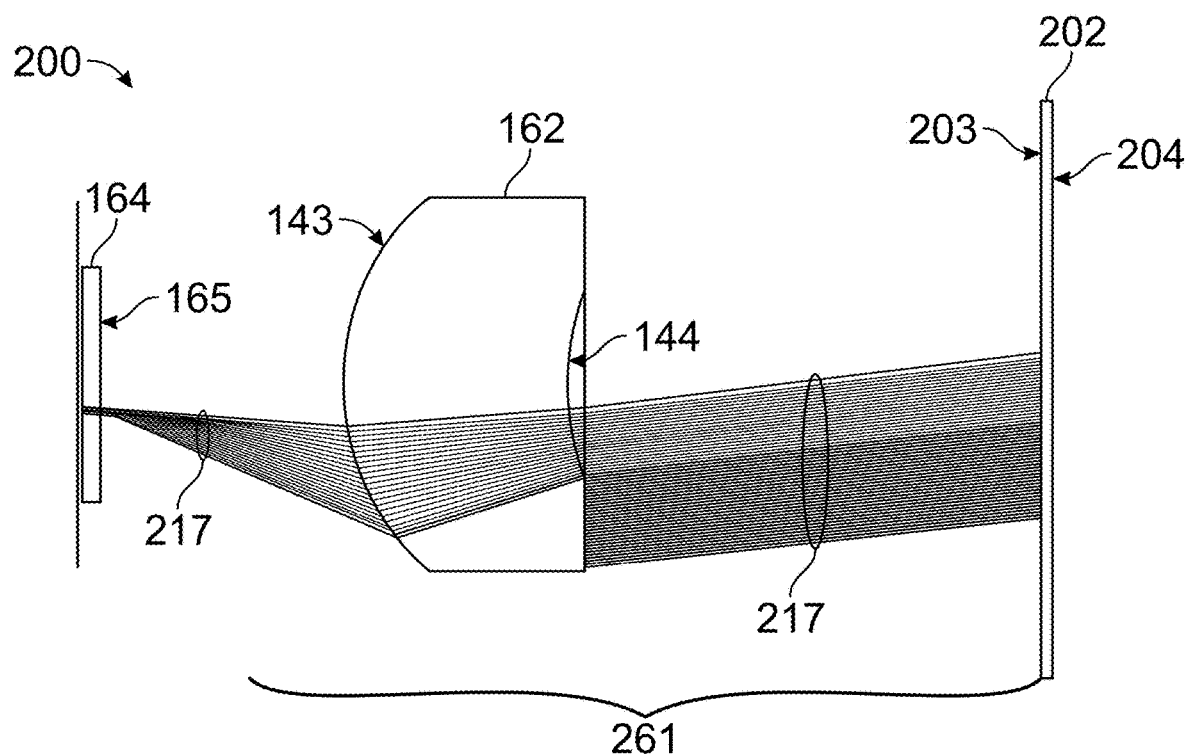

FIGS. 2 and 3 illustrate various paths of radiation 114 in imaging system 200 in accordance with embodiments of the disclosure. Similar to FIG. 1, radiation 114 enters optical system 261 along path 115 where it passes through flat protective window 202 and lens 162, and is received by imager 164 to be captured in an image. At least a portion of radiation 114 reflects off surface 165 of imager 164 and returns to flat protective window 202 along a path 116. Flat protective window 202 receives the reflected portion of radiation 114 at flat inner surface 203 and returns it back to imager 164 along a path 217. However, flat inner surface 203 does not defocus or disperse the returned reflected portion of radiation 114 in the manner of curved inner surface 103. Rather, the reflected portion of radiation 114 returned along path 217 remains focused due to its reflection off flat inner surface 203 in a narrow distribution pattern. As a result, ghost images associated with the reflected portion of radiation 114 may appear in images captured by imager 164 unless otherwise mitigated by a filter as discussed herein. The presence of such ghost images can be appreciated upon review of FIGS. 4 to 6.

Figure 4:
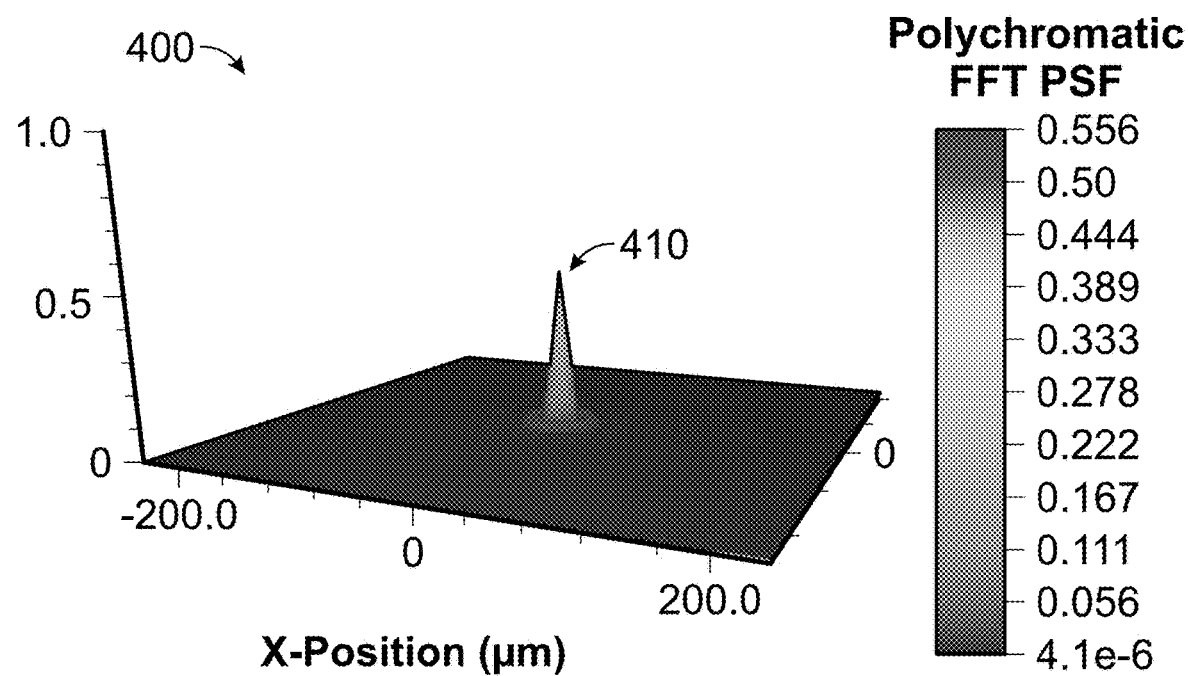
FIG. 4 illustrates a polychromatic fast Fourier transform of a point spread function of radiation captured by the imaging system of FIG. 2 in accordance with an embodiment of the disclosure.

FIG. 4 illustrates a diagram 400 of a polychromatic fast Fourier transform of a point spread function of the reflected portion of radiation returned along path 217 and captured by imager 164 in imaging system 200 for thermal wavelengths in accordance with an embodiment of the disclosure. As shown, diagram 400 includes a large peak 410 corresponding to the reflected portion of radiation returned along path 217 corresponding to feature 113 of scene 110.

Figure 5:
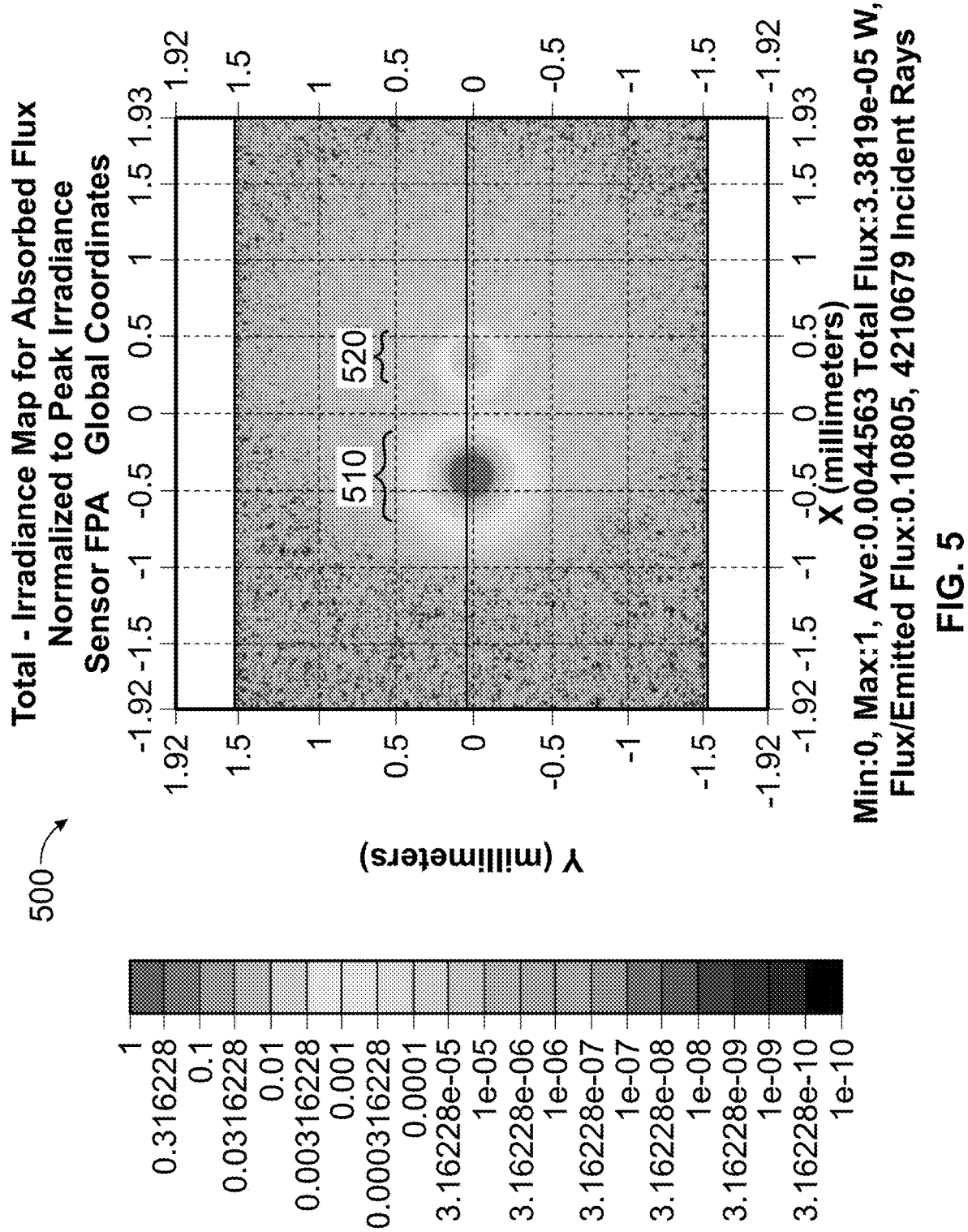
FIG. 5 illustrates an image of radiation captured by the imaging system of FIG. 2 in accordance with an embodiment of the disclosure.

FIG. 5 illustrates a thermal image 500 (e.g., an irradiance map) of radiation 114 captured by imager 164 in imaging system 200 for thermal wavelengths in accordance with an embodiment of the disclosure. Thermal image 500 includes a primary representation 510 of feature 113 corresponding to radiation 114 captured along path 115. Thermal image 500 further includes a secondary representation 520 of feature 113 corresponding to the reflected portion of radiation 114 captured along path 217 (e.g., a ghost image of feature 113). Secondary representation 520 is noticeable in thermal image 500 and demonstrates the existence of a ghost image in this embodiment.

Figure 6:
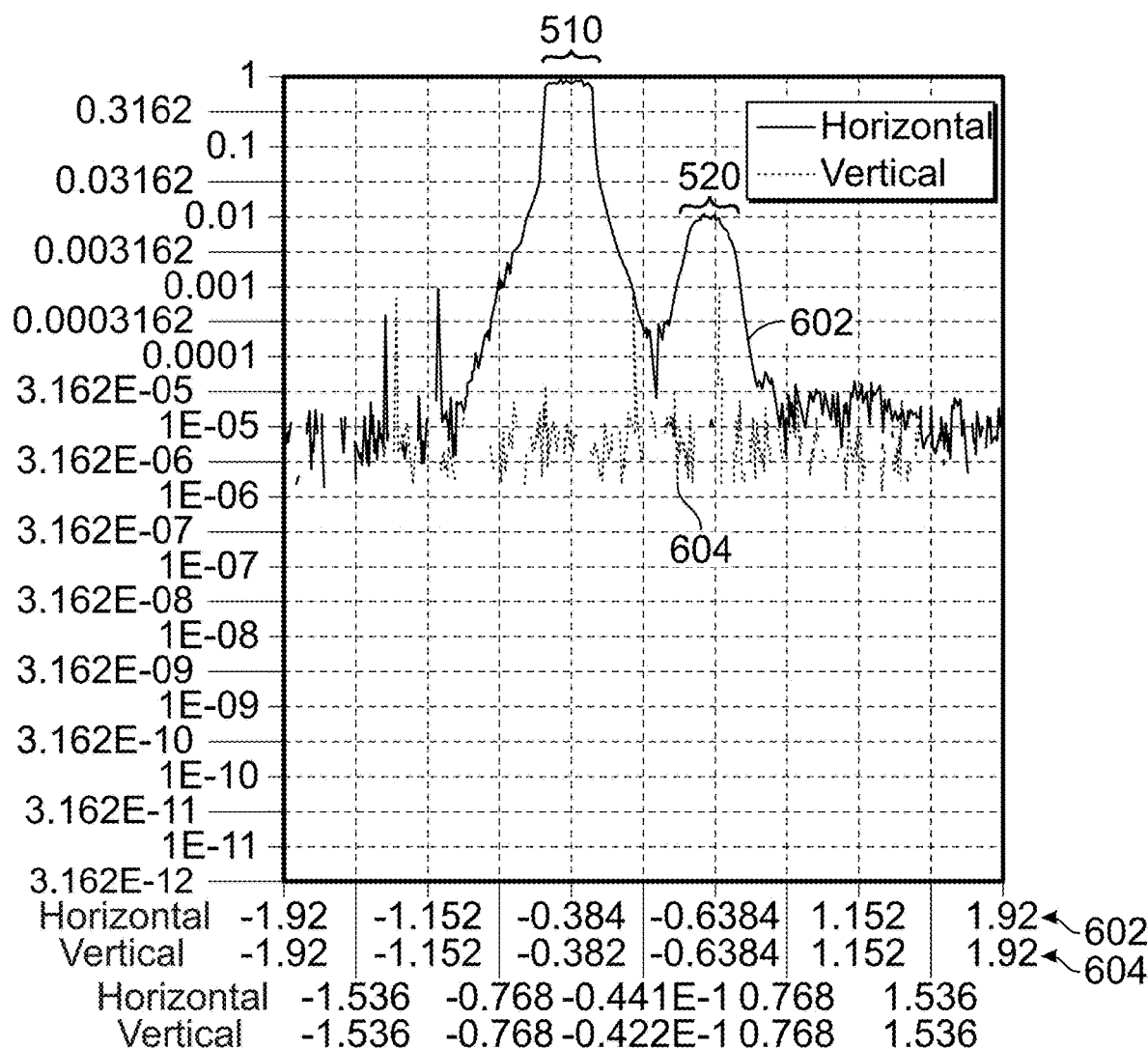
FIG. 6 illustrates response plots of radiation captured by the imaging system of FIG. 2 in accordance with an embodiment of the disclosure.

FIG. 6 illustrates response plots 602 and 604 taken along horizontal and vertical axes, respectively, of imager 164 for radiation 114 captured by imager 164 in imaging system 200 for thermal wavelengths in accordance with an embodiment of the disclosure. As shown, response plot 602 includes primary representation 510 and secondary representation 520 of feature 113 in a manner as discussed with regard to FIG. 5. In FIG. 6, response plots 602 and 604 are logarithmic and normalized to the peak radiation value received by imager 164. As shown, secondary representation 520 has a magnitude of approximately 1 percent of primary representation 510 which constitutes a significant reading compared to Noise Equivalent Temperature Difference (NETD) of a typical long wave infrared camera.

Figure 7:
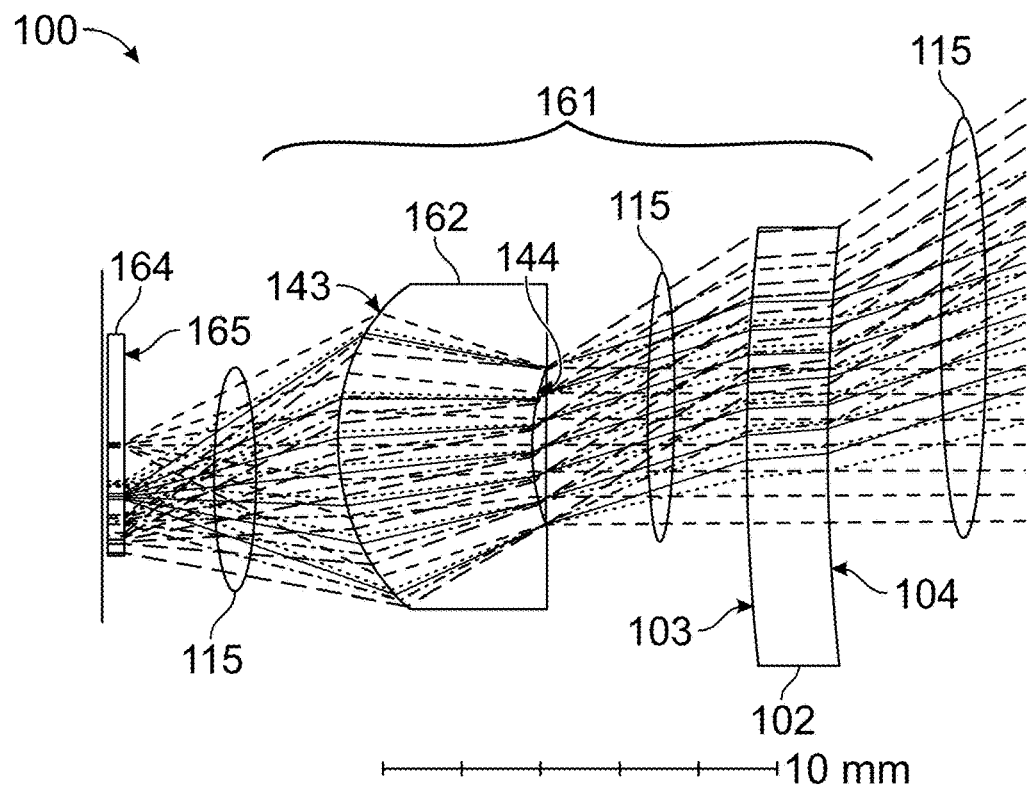
FIGS. 7 and 8 illustrate radiation paths in an imaging system having a curved protective window in accordance with embodiments of the disclosure.
Figure 8:
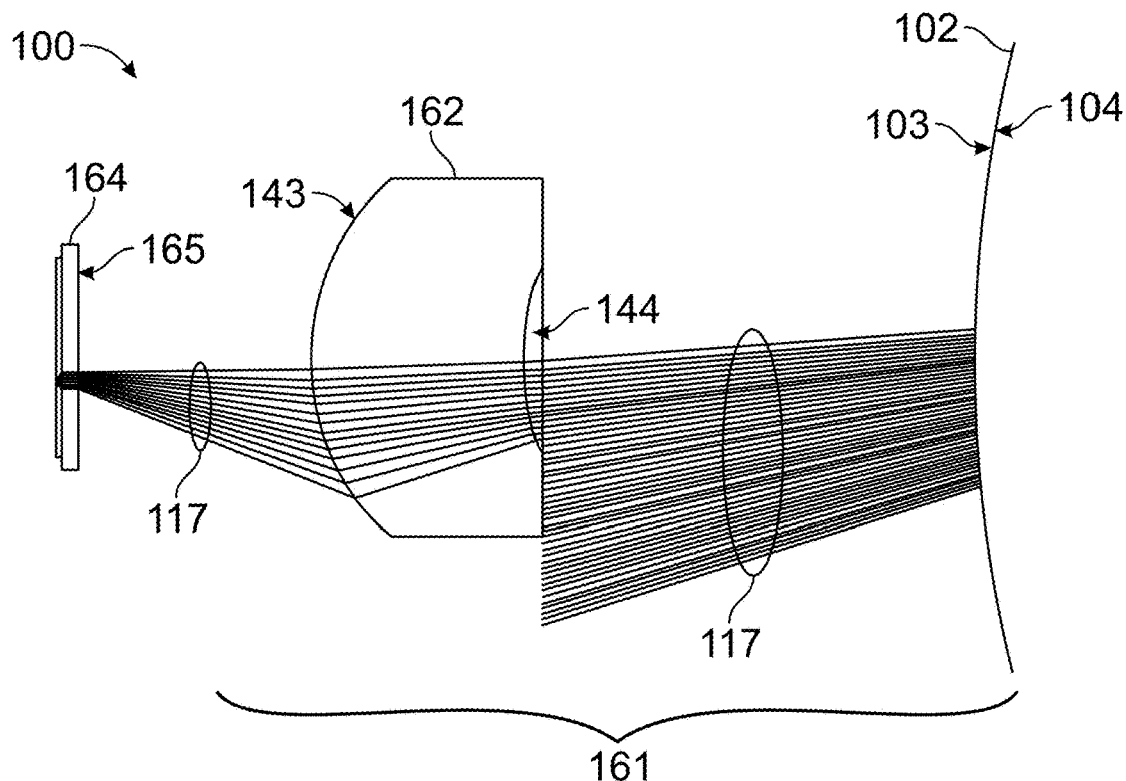

FIGS. 7 to 11 will now be discussed in relation to imaging system 100 with optical system 161 implemented in the manner of FIG. 1. For example, FIGS. 7 and 8 illustrate various paths of radiation 114 in imaging system 100 in accordance with embodiments of the disclosure.

As shown in FIG. 7, radiation 114 may enter optical system 161 through curved protective window 102 over multiple paths 115. As discussed, curved protective window 102 may be implemented as a ZPCW which provides reflection reducing benefits as discussed, but without adversely affecting the focus of optical system 161. This is evident from the ray traces of paths 115. As shown, ray traces corresponding to radiation 114 pass through curved protective window 102 without affecting their focus. For example, the ray traces entering through curved outer surface 104 are substantially unchanged when exiting through curved inner surface 103.

As shown in FIG. 8, the convex radius of curvature of curved inner surface 103 causes the reflected portion of radiation 114 to be returned along path 117 in a wide distribution pattern that defocuses the reflected portion of radiation 114 and disperses it over a large area of imager 164. This wide distribution pattern of FIG. 8 contrasts with the narrow distribution pattern of FIG. 3. As shown and discussed with regard to FIG. 3, flat inner surface 203 causes the reflected portion of radiation 114 to be returned along path 217 in a narrow and focused distribution pattern which results in prominent ghost images associated with the reflected portion of radiation 114.

Figure 9:
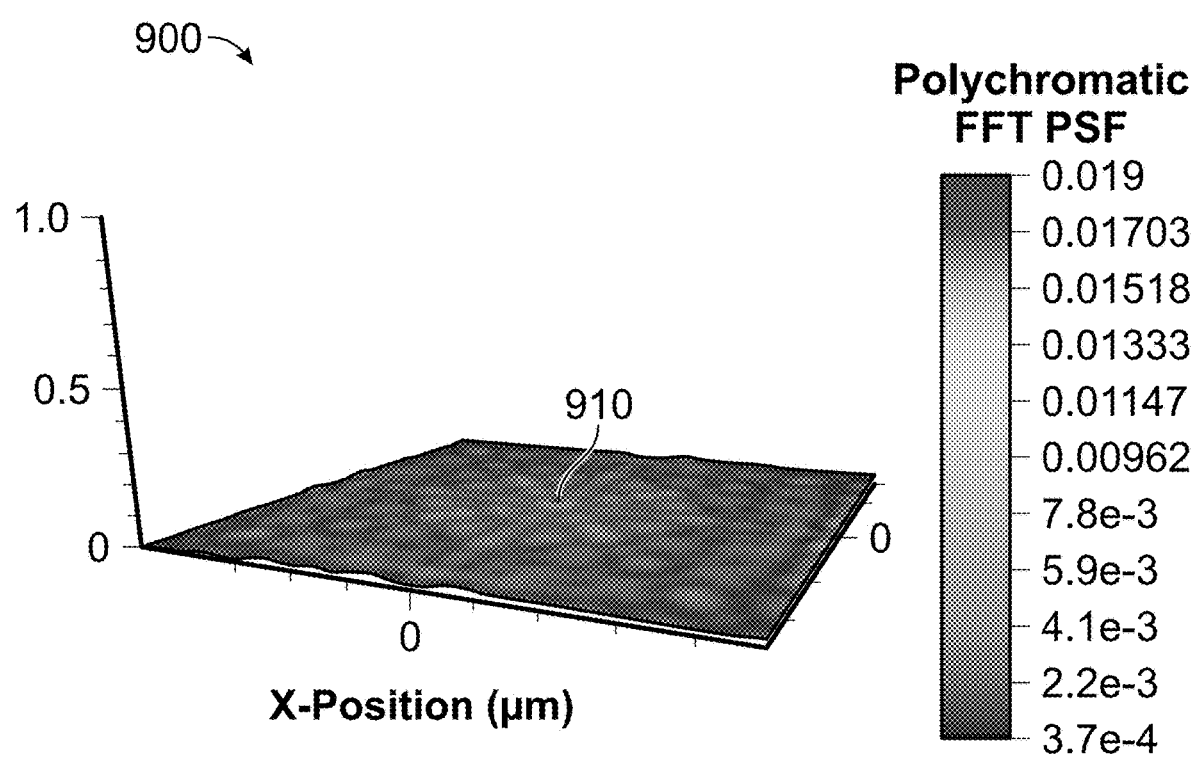
FIG. 9 illustrates a polychromatic fast Fourier transform of a point spread function of radiation captured by the imaging system of FIG. 7 in accordance with an embodiment of the disclosure.

FIG. 9 illustrates a diagram 900 of a polychromatic fast Fourier transform of a point spread function of the reflected portion of radiation returned along path 117 and captured by imager 164 in imaging system 100 for thermal wavelengths in accordance with an embodiment of the disclosure. As shown, diagram 900 includes a small peak 910 corresponding to the reflected portion of radiation returned along path 117 corresponding to feature 113 of scene 110. Upon comparison, it will be appreciated that peak 910 of FIG. 9 is smaller than peak 410 of FIG. 4, thus demonstrating a reduced magnitude of the reflected portion of radiation 114 in optical system 161 in comparison with optical system 261.

Figure 10:
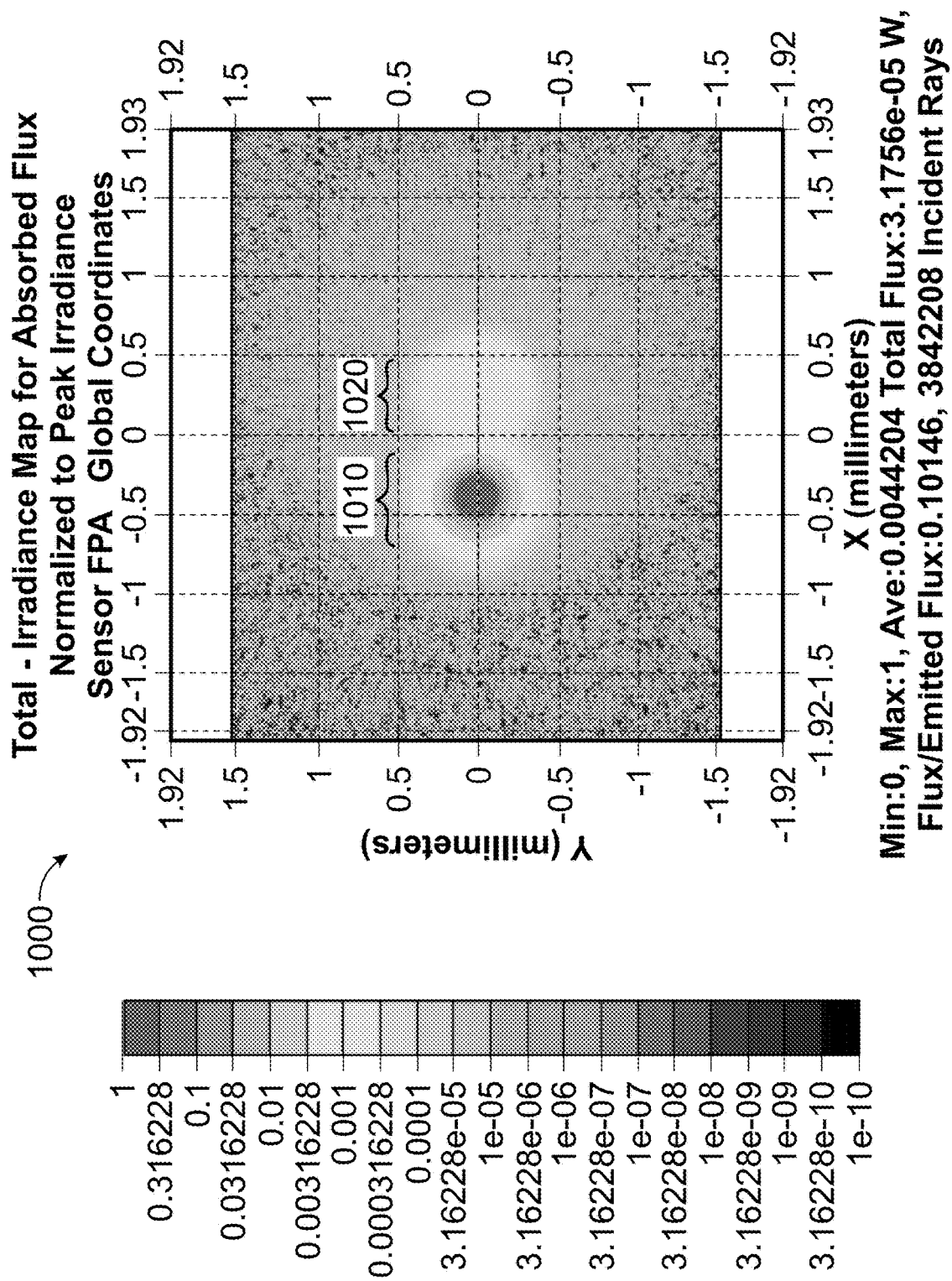
FIG. 10 illustrates an image of radiation captured by the imaging system of FIG. 7 in accordance with an embodiment of the disclosure.

FIG. 10 illustrates a thermal image 1000 of radiation 114 captured by imager 164 in imaging system 100 for thermal wavelengths in accordance with an embodiment of the disclosure. Thermal image 1000 includes a primary representation 1010 of feature 113 corresponding to radiation 114 captured along path 115. Thermal image 1000 further includes a secondary representation 1020 of feature 113 corresponding to the reflected portion of radiation 114 captured along path 117 (e.g., a ghost image of feature 113). Upon comparison, it will be appreciated that secondary representation 1020 of FIG. 10 is less noticeable than secondary representation 520 of FIG. 5, thus demonstrating a reduced magnitude of the reflected portion of radiation 114 in optical system 161 in comparison with optical system 261.

Figure 11:
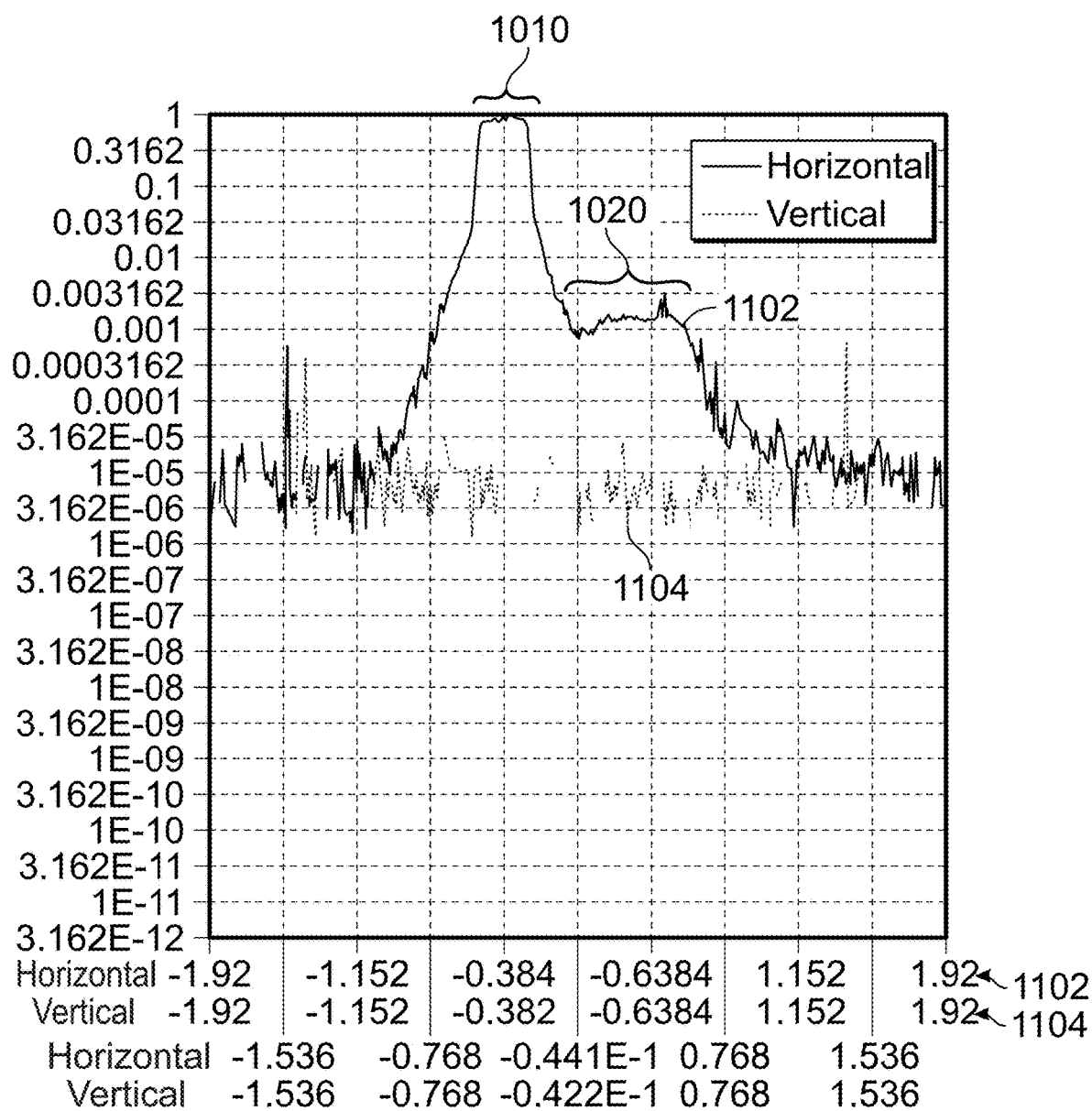
FIG. 11 illustrates response plots of radiation captured by the imaging system of FIG. 7 in accordance with an embodiment of the disclosure.

FIG. 11 illustrates response plots 1102 and 1104 taken along horizontal and vertical axes, respectively, of imager 164 for radiation 114 captured by imager 164 in imaging system 100 for thermal wavelengths in accordance with an embodiment of the disclosure. As shown, response plot 1102 includes primary representation 1010 and secondary representation 1020 of feature 113 in a manner as discussed with regard to FIG. 10. Upon comparison, it will be appreciated that secondary representation 1020 in response plot 1102 of FIG. 11 is smaller than secondary representation 520 in response plot 602 of FIG. 6 (e.g., reduced by at least one order of magnitude), thus demonstrating a reduced magnitude of the reflected portion of radiation 114 in optical system 161 in comparison with optical system 261.

FIGS. 12 to 15 will now be discussed in relation to an imaging system 1200 implemented in the manner of imaging system 100 of FIG. 1 but with an optical system 1261 in place of optical system 161. Optical system 1261 includes one or more optical elements including flat protective window 202 (e.g., implemented in the manner of FIGS. 2 and 3), lens 162 (e.g., implemented in the manner of FIG. 1), and a filter 1202. In various embodiments, anti-reflective coatings may be provided on any of the various surfaces of optical elements in optical system 1261.

In various embodiments, filter 1202 may be implemented as a long wave pass (LWP) filter, a short wave cut (SWC) filter, and/or other filter type to reduce the reflected portion of radiation 114 reflected from surface 165 of imager 164. For example, in the case of a thermal imaging system, filter 1202 may be configured to maximize transmission (e.g., pass radiation) in longer wavelengths corresponding to those in which anti-reflective coatings are effective (e.g., 8 to 14 microns) and minimize transmission (e.g., filter or attenuate radiation) in shorter wavelengths corresponding to those in which anti-reflective coatings are not effective (e.g., 2 to 7 microns).

Figure 12:
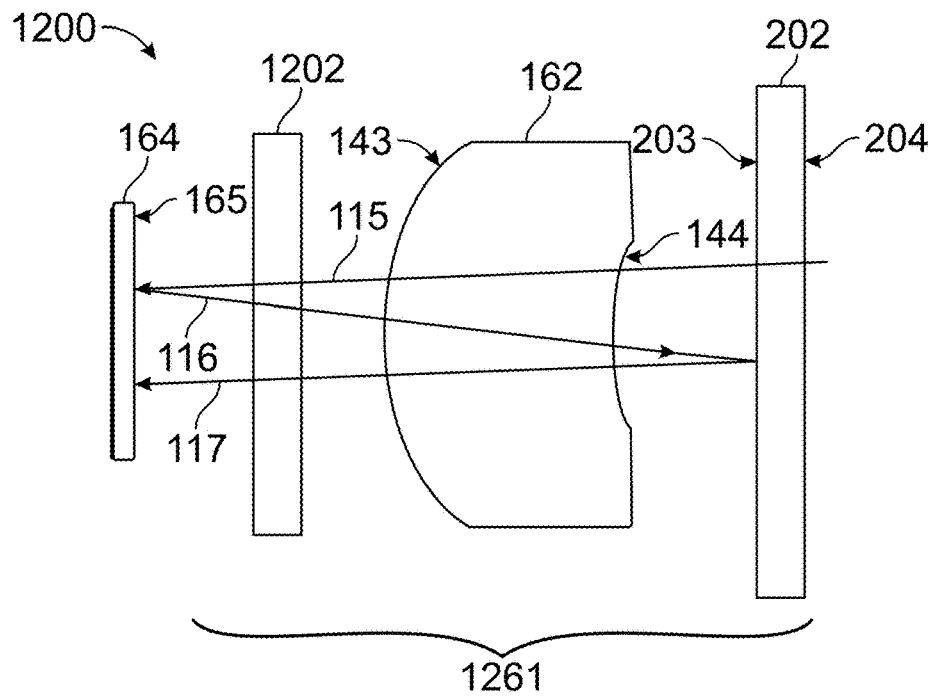
FIG. 12 illustrates an imaging system having a filter and a flat protective window in accordance with an embodiment of the disclosure.

For example, FIG. 12 illustrates imaging system 1200 including filter 1202 and flat protective window 202 in accordance with an embodiment of the disclosure. As shown in FIG. 12, filter 1202 is positioned between imager 164 and lens 162 to receive the reflected portion of radiation 114 from imager 164 along path 116. As a result, filter 1202 may attenuate the reflected portion of radiation 114 received along path 116 and reduce or prevent such reflections from being received or returned by flat inner surface 203 of flat protective window 202 along path 117. As a result, ghost images associated with such reflections may be reduced or eliminated.

Figure 13:
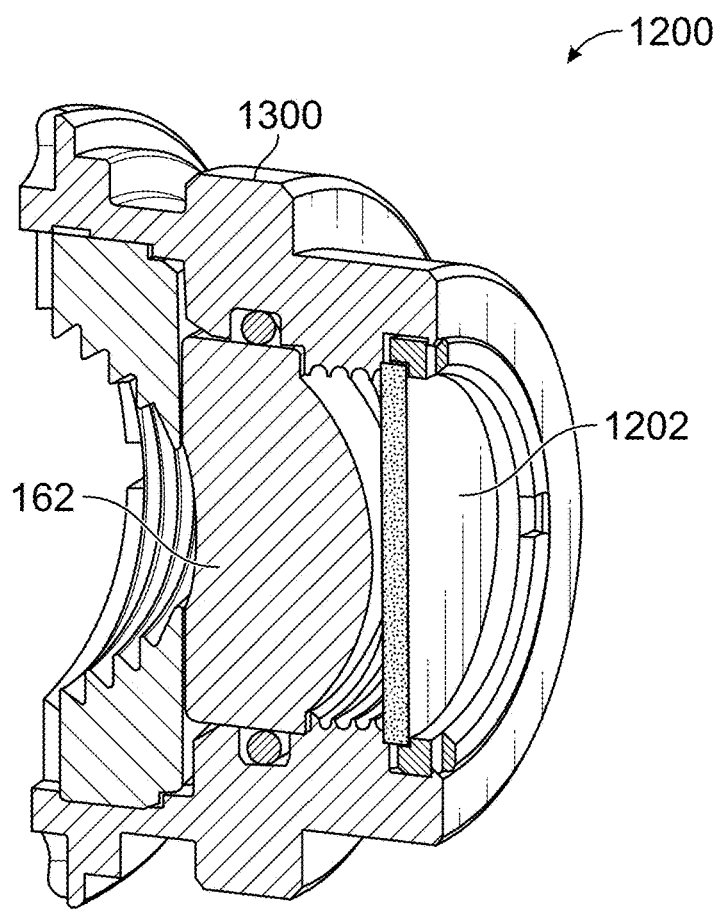
FIG. 13 illustrates cross-sectional view of a lens barrel including the imaging system of FIG. 12 in accordance with an embodiment of the disclosure.

Other embodiments are also contemplated. For example, FIG. 13 illustrates a cross-sectional view of a lens barrel 1300 including a portion of imaging system 1200 with filter 1202 positioned behind lens 162 in accordance with an embodiment of the disclosure.

Figure 14:
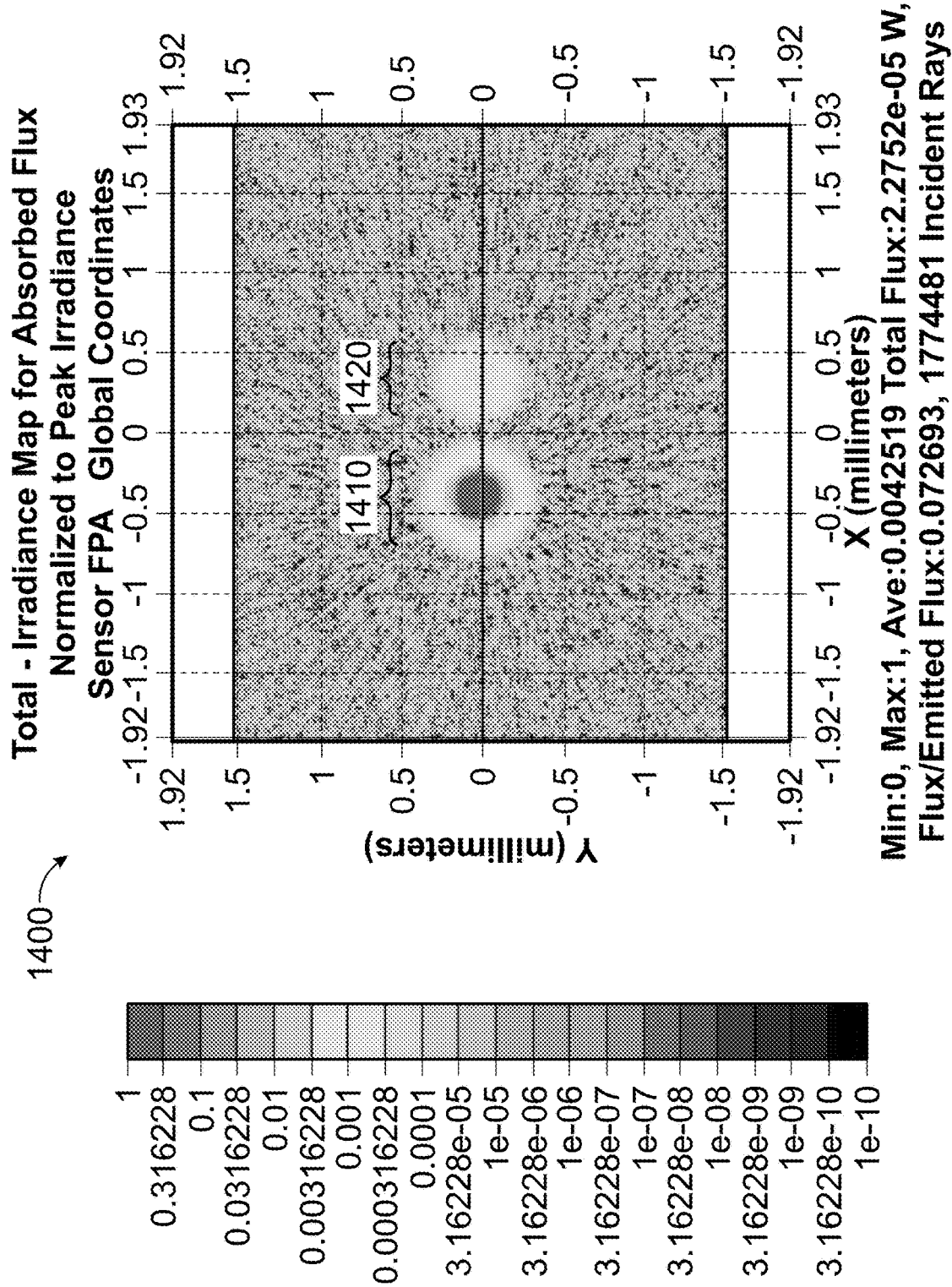
FIG. 14 illustrates an image of radiation captured by the imaging system of FIG. 12 in accordance with an embodiment of the disclosure.

FIG. 14 illustrates a thermal image 1400 of radiation 114 captured by imager 164 in imaging system 1200 for thermal wavelengths in accordance with an embodiment of the disclosure. Thermal image 1400 includes a primary representation 1410 of feature 113 corresponding to radiation 114 captured along path 115. Thermal image 1400 further includes a secondary representation 1420 of feature 113 corresponding to the reflected portion of radiation 114 captured along path 117 (e.g., a ghost image of feature 113). Upon comparison, it will be appreciated that secondary representation 1420 of FIG. 10 is less noticeable than with secondary representation 520 of FIG. 5, thus demonstrating a reduced magnitude of the reflected portion of radiation 114 in optical system 1261 in comparison with optical system 261, even with flat protective window 202 in place in both systems.

Figure 15:
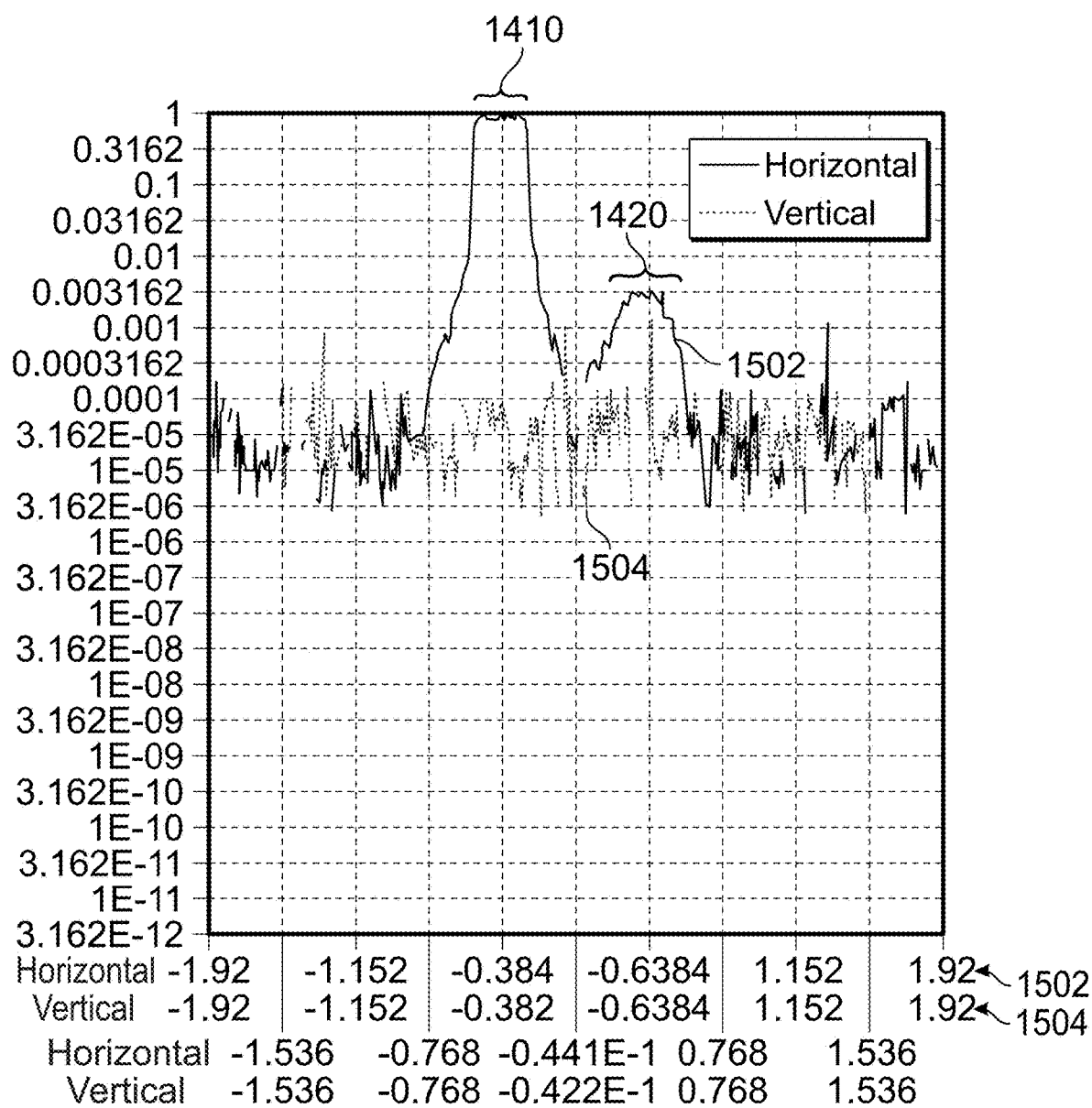
FIG. 15 illustrates response plots of radiation captured by the imaging system of FIG. 12 in accordance with an embodiment of the disclosure.

FIG. 15 illustrates response plots 1502 and 1504 taken along horizontal and vertical axes, respectively, of imager 164 for radiation 114 captured by imager 164 in imaging system 1200 for thermal wavelengths in accordance with an embodiment of the disclosure. As shown, response plot 1502 includes primary representation 1410 and secondary representation 1420 of feature 113 in a manner as discussed with regard to FIG. 14. Upon comparison, it will be appreciated that secondary representation 1420 in response plot 1502 of FIG. 11 is smaller than secondary representation 520 in response plot 602 of FIG. 6 (e.g., reduced by at least one order of magnitude), thus demonstrating a reduced magnitude of the reflected portion of radiation 114 in optical system 1261 in comparison with optical system 261.

Although imaging systems 100, 200, and 1200 have been described separately, some or all of their components may be combined in various embodiments. For example, in some embodiments, curved protective window 102 and filter 1202 may be provided in the same optical system of an imaging system to provide for both defocusing and filtering of reflected radiation.

Figure 16:
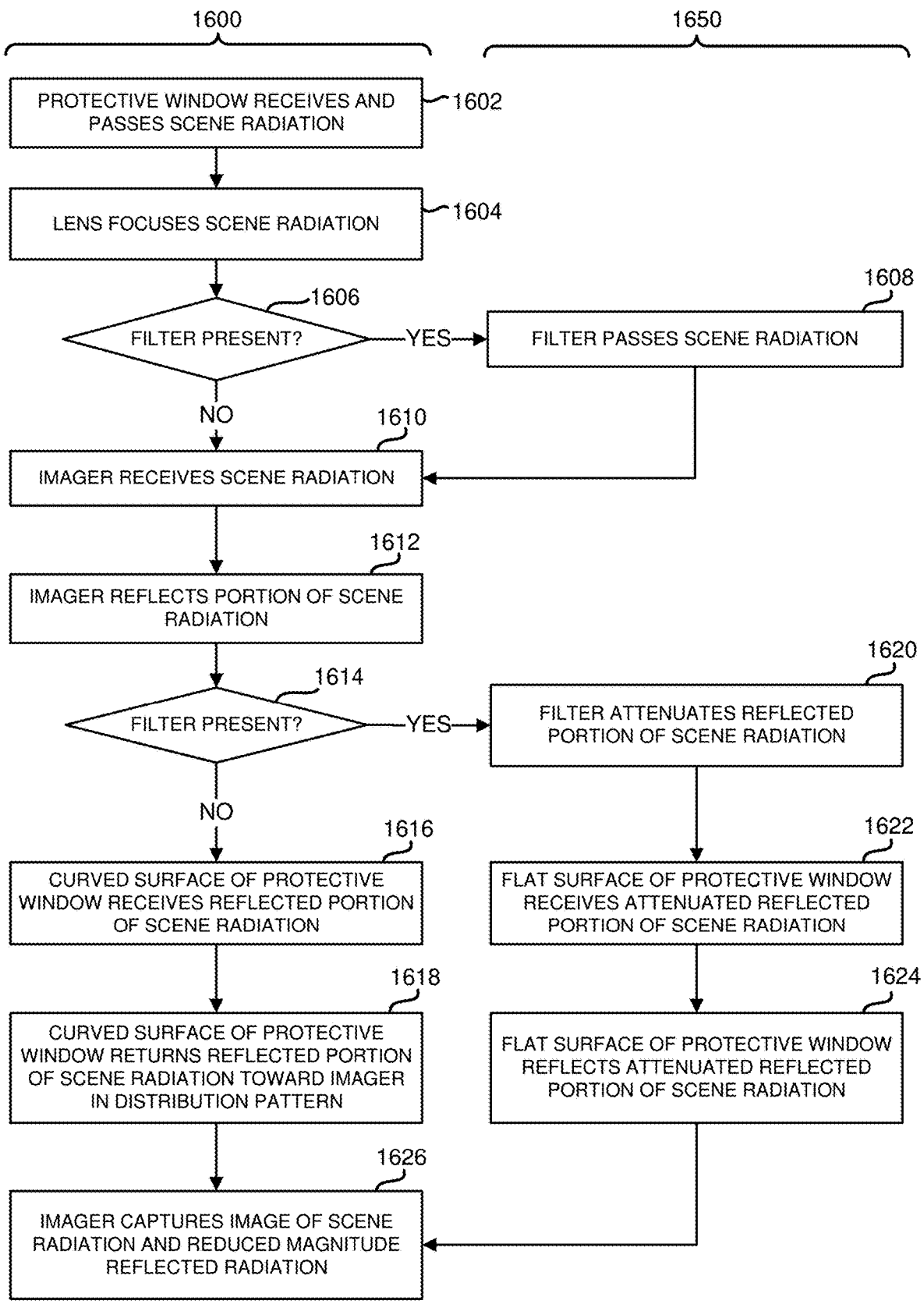
FIG. 16 illustrates a process of operating an imaging system in accordance with an embodiment of the disclosure.

FIG. 16 illustrates a process of operating various components of imaging systems 100, 200, and 1200 in accordance with an embodiment of the disclosure. As further discussed below, blocks 1600 correspond to certain operations performed using imaging system 100 with curved protective window 102 and certain operations performed using imaging systems 200/1200 with flat protective window 202. Blocks 1650 correspond to certain operations performed using imaging systems 200/1200 with flat protective window 202 and certain operations performed using imaging system 1200 with filter 1202.

In block 1602, curved protective window 102 or flat protective window 202 receives and passes radiation 114 from scene 110 along path 115. In block 1604, lens 162 focuses radiation 114 and passes it along path 115.

If filter 1202 is present (block 1606), then block 1608 is additionally performed in which filter 1202 also passes radiation 114 along path 115.

In block 1610, imager 164 receives radiation 114 from path 115. In block 1612, surface 165 of imager 164 reflects a portion of radiation 114 along path 116 toward curved protective window 102 or flat protective window 202.

If filter 1202 is not present (block 1614), the process continues to block 1616. In block 1616, curved inner surface 103 of curved protective window 102 receives the reflected portion of radiation 114 from path 116 (e.g., after it has passed back through lens 162).

In block 1618, curved inner surface 103 causes the reflected portion of radiation 114 to be returned along path 117 in a wide distribution pattern that defocuses the reflected portion of radiation 114 and disperses it over a large area of imager 165 as discussed.

If filter 1202 is present (block 1614), the process continues to block 1620. In block 1620, filter 1202 receives and attenuates the reflected portion of radiation 114 received along path 116 as discussed. In block 1622, flat inner surface 203 of flat protective window 202 receives any remaining reflected portion of radiation 114 from path 116 (e.g., after it has passed back through lens 162).

In block 1624, flat inner surface 203 causes the remaining reflected portion of radiation 114 to be returned along path 217 in a narrow distribution pattern as discussed. However, as also discussed, this remaining reflected portion of radiation 114 may still be substantially reduced as illustrated in FIGS. 14 and 15.

In block 1626, imager 164 captures one or more images of the originally received radiation 114 from path 115 and the reflected radiation from path 117 and/or 217. As discussed, the resulting thermal images may exhibit reduced ghost images associated with the reflected portion of radiation 114 as a result of the defocusing performed by curved inner surface 103 of curved protective window 102 and/or the attenuation performed by filter 1202.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   an optical element configured to pass radiation from a scene;
   an imager configured to capture images in response to the scene radiation, wherein the imager is a thermal imager disposed in a vacuum package comprising a lid configured to pass the scene radiation to the imager and reflect at least a portion of the scene radiation to the optical element;
   wherein the optical element comprises an inner surface with a convex radius of curvature facing the imager and configured to receive and return the reflected radiation toward the imager in a distribution pattern to reduce a magnitude of the reflected radiation in the captured images; and
   wherein the optical element is a zero power curved window comprising an outer surface with a concave radius of curvature facing the scene.

2. The system of claim 1, further comprising:
   a housing;
   wherein the imager is disposed within an interior of the housing; and
   wherein the optical element is a protective window configured to pass the scene radiation to the interior of the housing.

3. The system of claim 2, further comprising a lens positioned between the protective window and the imager and configured to focus the scene radiation on the imager.

4. The system of claim 1, wherein:
   the optical element comprises an anti-reflective coating configured to pass the scene radiation over a first wavelength range within an absorption wavelength range of the imager; and the reflected radiation comprises a second wavelength range separate from the first wavelength range and within the absorption wavelength range of the imager.

5. The system of claim 1, wherein the optical element has a focal length greater than 100 meters.

6. The system of claim 5, wherein the optical element is comprised of silicon, germanium, zinc sulfide, and/or zinc selenide.

7. The system of claim 1, further comprising a filter disposed between the optical element and the imager and configured to attenuate the reflected radiation.

8. A method comprising:
passing radiation from a scene by an optical element;
passing the scene radiation to an imager through a lid, wherein the imager is a thermal imager disposed in a vacuum package comprising the lid;
capturing images in response to the scene radiation by the imager;
reflecting, by the lid, at least a portion of the scene radiation to the optical element by the imager;
receiving the reflected radiation at an inner surface of the optical element having a convex radius of curvature facing the imager;
returning the reflected radiation toward the imager by the inner surface of the optical element in a distribution pattern to reduce a magnitude of the reflected radiation in the captured images; and
wherein the optical element is a zero power curved window comprising an outer surface with a concave radius of curvature facing the scene.

9. The method of claim 8, wherein:
the imager is disposed within an interior of a housing;
the optical element is a protective window; and
the passing by the optical element comprises passing the scene radiation to the interior of the housing by the protective window.

10. The method of claim 9, further comprising focusing the scene radiation on the imager by a lens positioned between the protective window and the imager.

11. The method of claim 8, wherein:
the optical element comprises an anti-reflective coating configured to perform the passing over a first wavelength range within an absorption wavelength range of the imager; and
the reflected radiation comprises a second wavelength range separate from the first wavelength range and within the absorption wavelength range of the imager.

12. The method of claim 8, wherein the optical element has a focal length greater than 100 meters.

13. The method of claim 12, wherein the optical element is comprised of silicon, germanium, zinc sulfide, and/or zinc selenide.

14. The method of claim 8, further comprising attenuating the reflected radiation by a filter disposed between the optical element and the imager.

15. A system configured to perform the method of claim 8, the system comprising:
the optical element;
the imager; and
the vacuum package.

16. A method comprising:
passing radiation from a scene by an optical element to an interior of a housing, wherein the optical element is a protective window;
passing the scene radiation to an imager through a lid, wherein the imager is a thermal imager disposed in a vacuum package comprising the lid, wherein the vacuum package is disposed within the interior of the housing;
capturing images in response to the scene radiation by the imager;
reflecting, by the lid, at least a portion of the scene radiation to the optical element by the imager;
receiving the reflected radiation at an inner surface of the protective window having a convex radius of curvature facing the imager; and
reducing, by the optical element, a magnitude of the reflected radiation in the captured images, wherein the reducing comprises returning the reflected radiation toward the imager by the inner surface of the protective window in a distribution pattern to reduce the magnitude of the reflected radiation in the captured images.

17. The method of claim 16, further comprising attenuating the reflected radiation by a filter disposed between the optical element and the imager.

18. The method of claim 16, wherein the optical element is a zero power curved window comprising an outer surface with a concave radius of curvature facing the scene.

19. A system configured to perform the method of claim 16, the system comprising:
the optical element;
the imager; and
the vacuum package.

20. The method of claim 16, wherein:
the optical element comprises an anti-reflective coating configured to perform the passing over a first wavelength range within an absorption wavelength range of the imager; and
the reflected radiation comprises a second wavelength range separate from the first wavelength range and within the absorption wavelength range of the imager.

* * * * *